Figure 1:
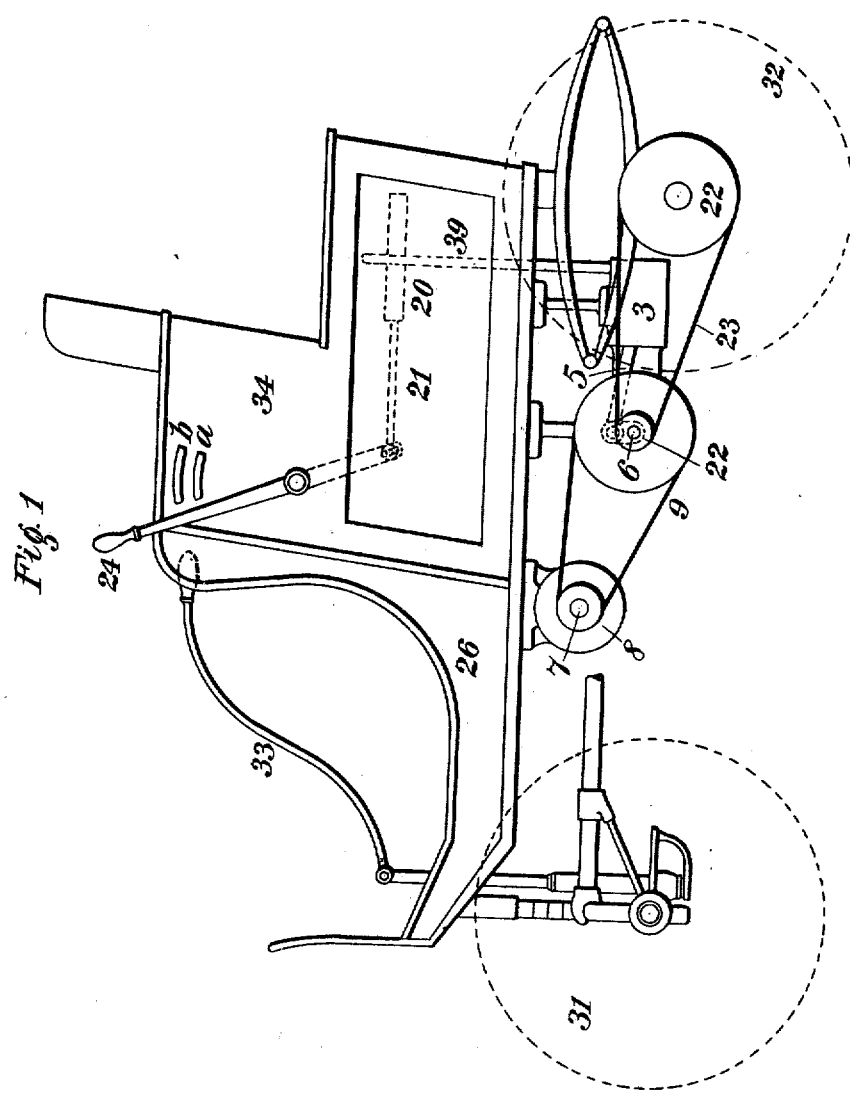

No. 842,827.

PATENTED JAN. 29, 1907.

C. J. COLEMAN.
MEANS FOR OPERATING MOTOR VEHICLES.
APPLICATION FILED FEB. 11, 1901.

3 SHEETS—SHEET 1.

Witnesses
Bert C. Jones.
Chas. W. Hildreth

Clyde J. Coleman
Inventor

By his Attorney
Henry D. Williams

No. 842,827. PATENTED JAN. 29, 1907.
C. J. COLEMAN.
MEANS FOR OPERATING MOTOR VEHICLES.
APPLICATION FILED FEB. 11, 1901.

3 SHEETS—SHEET 2.

Witnesses
Bert C. Jones
Chas. W. Hildreth

Clyde J. Coleman
Inventor
By his Attorney
Henry D. Williams

No. 842,827. PATENTED JAN. 29, 1907.
C. J. COLEMAN.
MEANS FOR OPERATING MOTOR VEHICLES.
APPLICATION FILED FEB. 11, 1901.

3 SHEETS—SHEET 3.

UNITED STATES PATENT OFFICE.

CLYDE J. COLEMAN, OF NEW YORK, N. Y.

MEANS FOR OPERATING MOTOR-VEHICLES.

No. 842,827.　　　Specification of Letters Patent.　　　Patented Jan. 29, 1907.

Application filed February 11, 1901. Serial No. 46,790.

*To all whom it may concern:*

Be it known that I, CLYDE J. COLEMAN, a citizen of the United States, and a resident of the borough of Manhattan, in the county of New York, city of New York, and State of New York, have invented new and useful Improvements in Means for Operating Motor-Vehicles, &c., of which the following is a specification, reference being had to the accompanying drawings, forming part thereof.

This invention relates to means for operating engines of motor-vehicles, &c., and the means embodying the invention are particularly designed for use in connection with explosive or gas engines and are especially adapted for use in automobiles, wherein the non-starting feature of explosive-engines has introduced many difficulties in the means for controlling the engines.

According to my invention auxiliary means are provided for starting the engine by the application of power thereto and for utilizing the power of the engine when the engine is self-actuated for the purpose of storing energy.

In the embodiment of my invention hereinafter described an electric motor is the auxiliary starting means, receiving its current from a storage battery or other suitable electrical storage means or means for storing electrical energy and yielding up such stored electrical energy, and the motor when self-actuated starts the engine and is an auxiliary motor and when actuated by the engine at a predetermined speed will act as a dynamo and store up electrical energy in the storage means. Means are also provided whereby the speed of the motor controls connections which adapt it to the change from a motor into a dynamo, so that upon the attainment of the predetermined speed this change will be effected automatically.

My invention further consists in the provision of means whereby a starting torque of maximum force may be employed; and my invention further consists in the provision of means for controlling the speed of the engine, so that it will drive the motor as a dynamo at a constant speed.

My invention further consists in certain novel features of construction and the combination of parts, all of which will now be particularly described in connection with the accompanying drawings, forming a part hereof.

Figure 2:
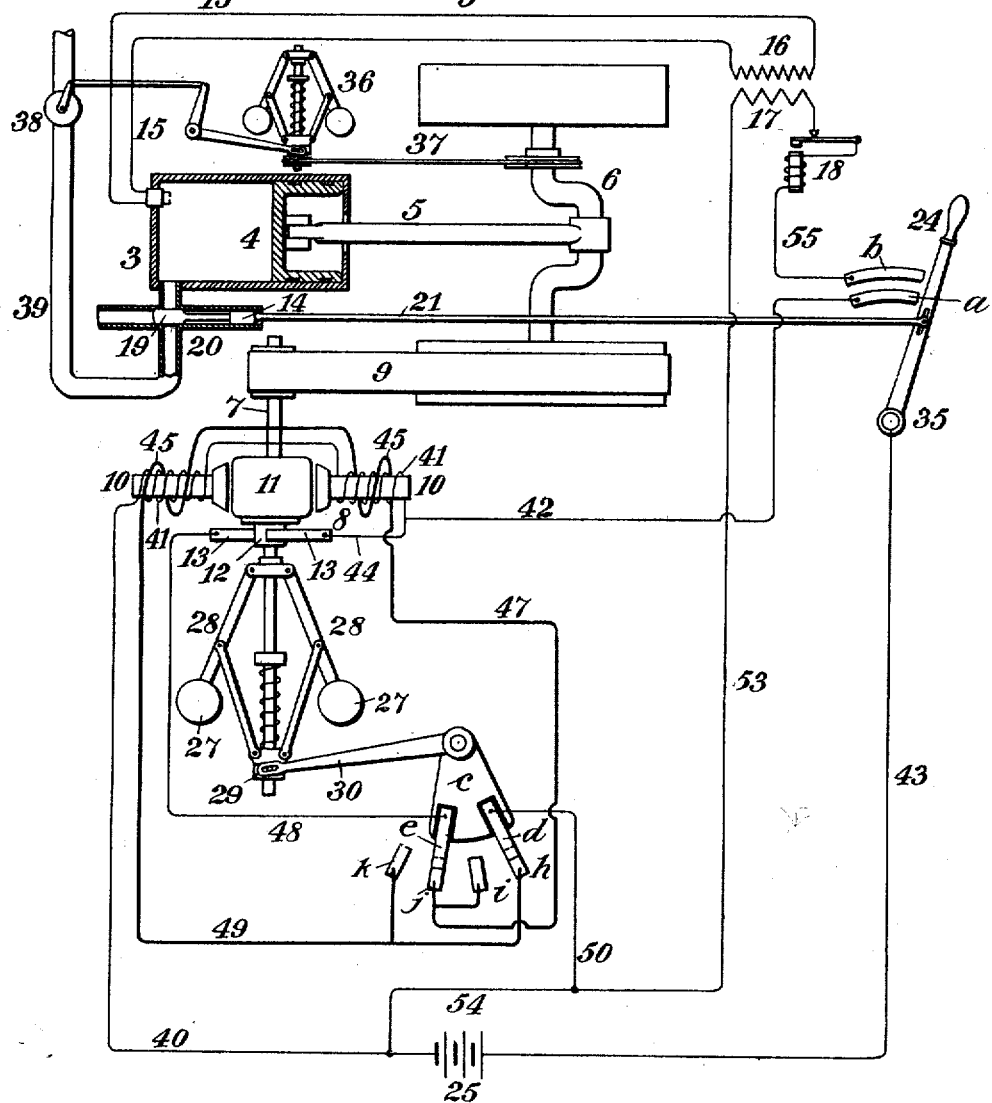
Figure 3:
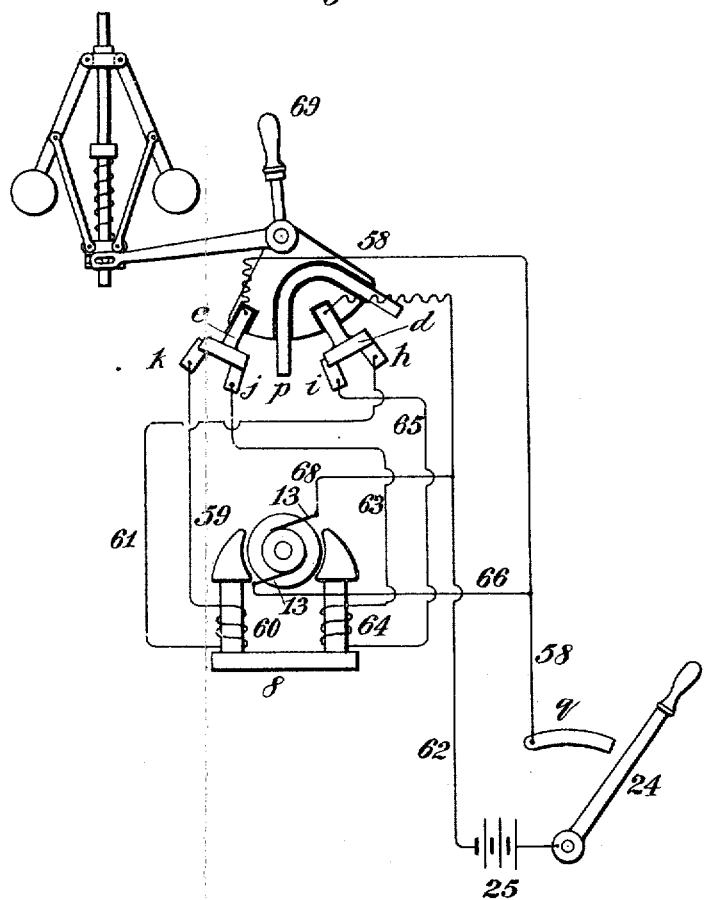

Figure 1 is a side elevation of a motor-vehicle or automobile provided with means embodying my invention. Fig. 2 represents diagrammatically the electrical connections, engine, motor, starting-lever, and current-controlling switch combined and arranged in accordance with my invention. Fig. 3 illustrates diagrammatically a modification in the controlling-switch and motor.

The motor-vehicle shown in Fig. 1 comprises a body 26, having a seat 34, front steering-wheels 31, and rear driving-wheels 32, and a steering-lever 33 and a controlling-lever 24, both of these levers being located in proximity to the seat and within easy reach of the operator. The engine and motor are shown as suspended from the body 26.

The engine 3, which is shown in Figs. 1 and 2, is an explosive-engine of the reciprocating type and is provided with a piston 4 and connecting-rod 5 and crank and shaft 6, and, as shown, the crank-shaft of the engine is connected to the shaft 7 of the motor 8 by a belt 9, running over pulleys on both of these shafts. Such a connection would be desirable with a comparatively slow speed engine of the type shown; but with high-speed engines the motor and engine could have a common shaft. The crank-shaft of the engine is shown as connected by a chain and sprockets 22 23 with the rear or driving wheels of the vehicle. The motor has field-magnets 10, an armature 11, and commutator 12, the commutator rotating in contact with commutator-brushes 13 13. The details of construction of the motor are not particularly illustrated, except that the field-windings are indicated. The engine is shown as provided with a sparking device arranged to employ a jump-spark and connected by wires 15 15 to a secondary coil 16, arranged so as to be inductively acted upon by a primary coil 17, and in the circuit of the primary coil 17 is arranged an electromagnetic make-and-break device 18, which may be of any suitable construction.

The supply of the motive or explosive medium or fluid to the engine is opened and closed by a valve 20, having a sliding gate 19 and a stopper 14 on the same stem and actuated by a rod 21 from the controlling-lever 24. The point of connection of this valve with the controlling-lever is altered to a position above the pivotal point of the lever in the diagram Fig. 2 for convenience of illustration; but the construction of the valve proper is illustrated in section in this figure, and, as will be seen, the valve 20 is so constructed that the initial movement of the controlling-lever will open it wide, and its wide-open condition will not be altered by further movement thereof. The regulation of the supply of motive fluid is effected automatically, and, as shown, this regulation is effected by a centrifugal governor 36, driven by a belt 37 from the shaft 6 of the engine and actuating a governing-valve 38 in the supply-pipe 39. By the action of this governor a substantially constant speed of the engine is attained after the initial or starting movement, as is desirable when employing the motor as a dynamo to charge the storage battery, for a material increase in the speed of the motor above the normal would be destructive to the storage batteries.

Switch-plates $a$ and $b$ are arranged so as to be connected by the controlling-lever when this lever is moved over into position to open the supply-valve 19, and this lever, or the lower part thereof, may be partly or wholly of conductive material. A suitable secondary or storage battery 25 is indicated and is connected up with the other devices in the manner to be hereinafter described.

Automatic means are provided for controlling the connections of the motor and other parts through a controlling-switch having an oscillating plate $c$, these automatic means being shown as centrifugal governor-balls 27 27, mounted on arms 28 28 on the shaft of the motor-dynamo and actuating a sliding collar 29, which is engaged by an arm 30 of the controlling-switch. This switch comprises the plate $c$, of insulating material or having insulated connections to brushes $d$ and $e$ and switch-blocks $h$, $i$, $j$, and $k$, over and in contact with which such switch-brushes are severally arranged to move.

In the construction shown in Fig. 2 the field-magnets 10 10 of the motor are shown as provided with compound windings, including shunt-coils 41 41 and series coils 45 45, and the circuit-controlling means are arranged to connect all of these windings for a motor effect when the motor is used as a motor and for producing a field of great intensity, and thereby producing the maximum power or torque for the engine-starting operation, and these circuit-controlling means are also arranged to reverse the connections of the series coils in accordance with the reverse current flowing through the armature of the motor when the motor is used as a dynamo, whereby a dynamo with compound windings is produced having what are known as "series" and "long" shunt field-coils. When these connections exist, the current generated in the armature flows through the series coils and through the shunt-coils in series with each other, and the storage battery is connected across the terminals of the shunt-coils of the field and in parallel with those shunt-coils as respects the current generated in the armature, so that the battery is charged by a portion of the current from the armature which passes through the battery in lieu of passing through the shunt-coils of the field. It will be noted that under these conditions the series field-coils are energized by current from the armature, but that the current through them must flow also through two branch circuits in parallel with each other and in series with the series coils, one of which branch circuits is comprised in and contains the opposing resistance of the shunt-coils, and the other of which branch circuits leads through the storage battery and encounters its electromotive force opposed to the flow of current from the armature and through the series coils. Therefore the intensity of current in the series coils is much less under these conditions than when the motor is started as a motor by the battery, and the fields of the motor-dynamo are therefore energized with lesser intensity than when the motor is required to develop a large torque in starting the engine. Also it will be noted that under these conditions the current flowing through the armature and the series coils and through the battery to charge the latter is proportionate only to the excess of the electromotive force of the armature over and above the counter or opposed electromotive force of the storage battery, so that the current and the rate of charging the storage battery is much less than the current received from the storage battery and the rate of discharge in such storage battery when it is starting the motor as a motor and with the full electromotive force of the battery available for forcing current through such series coils and armature of the motor.

The various parts are shown in their normal position with the engine and motor at rest. To start the engine, the controlling-lever 24 is moved to the left, Figs. 1 and 2, and opens the supply-valve 19 and closes connection between the two switch-plates $a$ and $b$ and the conductive part of the controlling-lever from such plates to the pivot 35 of the lever. The current from the storage battery then flows through the wire 40 and shunt field-coils 41 41 of the motor through wire 42, switch-plate $a$, lever 24, and wire 43 back to battery; also, from the battery through wires 54 50, switch-brush $d$, block $h$, wire 49, series field-coils 45 45, wire 47, switch-block $j$, brush $e$, wire 48, lower commutator-brush 13, coils of armature 11, upper commutator-brush 13, wires 44 42, switch-plate a, lever 24, and wire 43 back to battery. Thus the battery-current energizes in multiple the shunt field-coils 41 and the series field-coils 45 and a field of great intensity is produced for the purpose of starting the engine and vehicle.

The connections of the motor will continue, as above described, until the speed of the motor is sufficiently high to actuate the switch and by such actuation to bring the switch-brushes in contact with the blocks intermediate between those with which the switch-brushes are normally in contact, and the governor is usually so constructed and adjusted that this connection will be attained when the normal speed of the engine is attained, and the engine and motor are so constructed that under these conditions the motor will generate a current of sufficiently high voltage for charging the storage battery. When such a speed has been attained and the controlling-switch has been thus actuated, the armature becomes a generator and the current flows from this armature through the lower commutator-brush 13, wire 48, brush e, block k, wire 49, series field-coils 45 45, wire 47, block i, brush d, wires 50 54 to and through the battery 25, recharging the same, wire 43, lever 24, switch-plate a, wires 42 44 to upper commutator-brush 13, and back to the armature-coils. Current also flows from the armature through its circuit already traced up to the wire 54 and the storage battery and thence through a branch including the shunt field-coils and being in parallel with the branch already described which leads through the battery to recharge it, the branch through the shunt field-coil being as follows: through wire 40 and shunt field-coils 41 41 and to the wire 44, where it rejoins the branch through the battery and continues on to the armature of the dynamo. The sparking device is also operated by the actuation of the controlling-lever 24, and when the lever is moved to starting position, as above described, the current for the sparking device will flow from the battery 25, through the wires 54 53, primary coil 17, make-and-break device 18, and wire 55, to the switch-block b and from the switch-block b, through the lever 24 and wire 43, back to battery. This circuit will be maintained so long as the starting-lever is in operating position.

In the modified construction shown in Fig. 3 there is only one set of coils in the field-magnets, and these field-magnet coils are connected in multiple when the motor is used as a motor and are connected in series when the motor is used as a dynamo, and the armature-coils are always connected in multiple with the field-windings. To effect this modification, the switch-brushes d and e are widened, so as when in a normal position to bridge the two switch-blocks with which they move in contact, and an additional bridge-piece p is provided. When the controlling-lever 24 is actuated to start the engine, the current flows from the battery 25, through the wire 62 and wire 68, upper commutator-brush 13, armature-coils, lower commutator-brush 13, wires 66 58, switch-block q, and lever 24, back to battery, and also from the wire 62 to the brush d, and dividing at the brush d flows in two separate paths, as follows: through block h, wire 61, coil 60 of one of the poles of the field-magnet, wire 59, block k to the brush e, where the two separate paths reunite, and from the brush d, through block i, wire 65, coils 64 of the other pole of the field-magnet, wire 63, and block j, to brush e, and from the brush e, through wire 58, switch-block q, and lever 24, back to battery. It will be seen that the current now flows through the field-coils in multiple, producing circuits of low resistance and a consequent large expenditure of battery-power, whereby the field is of great intensity. When the controlling-switch is actuated by the governor, the current will flow from the brush d through the block i only and will flow from the block i, through the wire 65, field-coils 64, and wire 63, to the block j, and from this block j, through the bridge-piece p, to the block h, and from the block h, through the wire 61, field-magnet coils 60, and wire 59, to the block k and brush e, and, as will be seen, the current will now flow through the field-magnet coils in series, producing a field of less intensity. The motor is now a dynamo, and the current generated in the armature will flow through lower commutator-brush 13, wires 66 58, plate q, lever 24, to and through the battery 25, recharging the battery, and through wires 62 68 to the upper brush 13 of the commutator and back to the armature.

In Fig. 3 the connections for the sparking device are omitted, and it is of course evident that these would not be needed in an engine where an electric igniting device was not employed. The connection between the shaft of the motor and the governor is not here shown; but it is obvious that any suitable connection could be made. A handle 69 is shown upon the controlling-switch, and, if desired, the governor could be omitted and the switch manually operated. It is of course obvious that various modifications could be made in the construction and electric connections within the spirit and scope of my invention, and parts of my invention could be used separately or in connection with parts of different constructions from those shown or indicated in the drawings.

What I claim, and desire to secure by Letters Patent, is—

1. The combination of an engine, running-gear of a vehicle connected therewith, an auxiliary self-starting motor and power device, such motor and the engine being connected together so that each is adapted to actuate the other, a speed-governor for the engine whereby a substantially constant speed thereof is maintained, means for storing energy connected to such motor and power device, and means located within reach of the operator for operating the auxiliary motor and operating the engine, substantially as set forth.

2. The combination of an engine, running-gear of a vehicle connected therewith, an auxiliary self-starting motor and power device, such motor and the engine being connected so that each is adapted to actuate the other, means for storing energy adapted to energize the motor to actuate the same and to receive energy from the motor when the motor is actuated as a power device by the engine, means located within reach of the operator for operating the engine and for connecting the motor with the storing means so as to obtain a maximum power from the motor and means for connecting the auxiliary motor as a power device with the storing means so as to obtain a storage of power at a minimum rate, substantially as set forth.

3. The combination of an engine, running-gear of a vehicle connected therewith, an auxiliary self-starting motor and power device, such motor and the engine being connected so that each is adapted to actuate the other, means for storing energy adapted to energize the motor to actuate the same and to receive energy from the motor when the motor is actuated as a power device by the engine, means located within reach of the operator for operating the engine and for connecting the motor with the means for storing energy so as to obtain a maximum power from the motor and automatic means for connecting the motor as a power device with the storing means so as to obtain a storage of power at a minimum rate, substantially as set forth.

4. The combination of an engine and an electric motor connected together so that each is adapted to actuate the other, a speed-governor for the engine whereby a substantially constant speed thereof is maintained, electrical storage means, and means for connecting the motor, as a motor, with the storage means to start the engine, and for connecting the motor, as a dynamo, with the storage means, substantially as set forth.

5. The combination of a constant-speed engine and an electric-motor dynamo connected together so that each is adapted to actuate the other, electrical storage means, and means controlled by the speed of the motor for connecting the motor, as a motor, with the storage means to start the engine, and for connecting the motor, as a dynamo, with the storage means, when the normal speed of the engine has been attained, substantially as set forth.

6. The combination of an engine and an electric motor connected together so that each is adapted to actuate the other, a speed-governor for the engine whereby a substantially constant speed thereof is maintained, electrical storage means, and means controlled by the speed of the motor for connecting the motor, as a motor, with the storage means to start the engine, and for connecting the motor, as a dynamo, with the storage means when the normal speed of the engine has been attained, substantially as set forth.

7. The combination of an engine and an electric motor connected together so that each is adapted to actuate the other, electrical storage means, and means for connecting the motor with a field of great intensity, as a motor, with the storage means to start the engine, and for connecting the motor with a field of less intensity, as a dynamo, with the storage means, substantially as set forth.

8. The combination of an engine and an electric motor connected together so that each is adapted to actuate the other, a speed-governor for the engine, electrical storage means and means for connecting the motor with a field of great intensity, as a motor, to start the engine, and for connecting the motor with a field of less intensity, as a dynamo, with the storage means, substantially as set forth.

9. The combination of an engine and an electric motor connected together so that each is adapted to actuate the other, electrical storage means, and means controlled by the speed of the motor for connecting the motor with a field of great intensity, as a motor, with the storage means to start the engine, and for connecting the motor with a field of less intensity, as a dynamo, with the storage means, substantially as set forth.

10. The combination of an engine and an electric motor connected together so that each is adapted to actuate the other, a speed-governor for the engine, electrical storage means, and means controlled by the speed of the motor for connecting the motor with a field of great intensity, as a motor, with the storage means to start the engine, and for connecting the motor with a field of less intensity, as a dynamo, with the storage means, substantially as set forth.

11. The combination of an engine and an electric motor connected together so that each is adapted to actuate the other, electrical storage means, a lever for admitting and cutting off the supply of motive medium to the engine, and means actuated by such lever for connecting the motor, as a motor, with the storage means to start the engine, and means operated independently of such lever for disconnecting the motor as a motor and for connecting the motor, as a dynamo, with the storage means, substantially as set forth.

12. The combination of an engine and an electric motor connected thereto so that each is adapted to actuate the other, a speed-governor for the engine, electrical storage means, a lever for admitting and cutting off the supply of motive medium to the engine and means actuated by such lever for connecting the motor, as a motor, with the storage means to start the engine, and means operated independently of such lever for connecting the motor, as a dynamo, with the storage means, substantially as set forth.

13. The combination of an engine and an electric motor connected thereto so that each is adapted to actuate the other, electrical storage means, a lever for admitting and cutting off the supply of motive medium to the engine, and means actuated by such lever for connecting the motor, as a motor, with the storage means to start the engine, and controlled by the speed of the motor independently of such lever for connecting the motor, as a dynamo, with the storage means, substantially as set forth.

14. The combination of an engine and an electric motor connected thereto so that each is adapted to actuate the other, a speed-governor for the engine, electrical storage means, a lever for admitting and cutting off the supply of motive medium to the engine, and means actuated by such lever for connecting the motor, as a motor, with the storage means to start the engine, and controlled by the speed of the motor independently of such lever for connecting the motor, as a dynamo, with the storage means, substantially as set forth.

15. The combination of an engine and an electric motor connected together so that each is adapted to actuate the other, electrical storage means, a lever for admitting and cutting off the supply of motive medium to the engine, and means actuated by such lever for connecting the motor with a field of great intensity, as a motor, with the storage means to start the engine and operated independently of such lever for connecting the motor with a field of less intensity, as a dynamo, with a storage means, substantially as set forth.

16. The combination of an engine and an electric motor connected together so that each is adapted to actuate the other, a speed-governor for the engine, electrical storage means, a lever for admitting and cutting off the supply of motive medium to the engine, and means actuated by such lever for connecting the motor with a field of great intensity, as a motor, with the storage means to start the engine, and operated independently of such lever for connecting the motor with a field of less intensity, as a dynamo, with the storage means, substantially as set forth.

17. The combination of an engine and an electric motor connected together so that each is adapted to actuate the other, a lever for admitting and cutting off the supply of motive medium to the engine and means actuated by such lever for connecting the motor with a field of great intensity, as a motor, with the storage means to start the engine, and controlled by the speed of the motor independently of such lever, for connecting the motor with a field of less intensity, as a dynamo, with the storage means, substantially as set forth.

18. The combination of an engine and an electric motor connected together so that each is adapted to actuate the other, a speed-governor for the engine, electrical storage means, a lever for admitting and cutting off the supply of motive fluid to the engine, and means actuated by such lever for connecting the motor with a field of great intensity, as a motor, with the storage means to start the engine, and controlled by the speed of the motor independently of such lever for connecting the motor with a field of less intensity, as a dynamo, with the storage means, substantially as set forth.

19. The combination of an engine and an electric motor connected together so that each is adapted to actuate the other, means controlled by the speed of the motor, electrical storage means, and connections from the storage means to the motor including a controlling-switch actuated by the speed-controlled means, substantially as set forth.

20. The combination of an engine and an electric motor connected together so that each is adapted to actuate the other, a speed-governor for the engine, means controlled by the speed of the motor, electrical storage means, and connections from the storage means to the motor including a controlling-switch actuated by the speed-controlled means, substantially as set forth.

21. The combination of an engine and an electric motor connected together so that each is adapted to actuate the other, running-gear of a vehicle connected with the engine, means controlled by the speed of the motor, electrical storage means, a lever located within reach of the operator and controlling both the engine and the motor, and connections from the storage means to the motor controlled by such lever and including a controlling-switch actuated by the speed-controlled means independently of such lever, substantially as set forth.

22. The combination of an engine and an electric motor connected together so that each is adapted to actuate the other, a speed-governor for the engine, running-gear of a vehicle connected with the engine, means controlled by the speed of the motor, electrical storage means, lever located within reach of the operator and controlling both the engine and the motor, and connections from the storage means to the motor controlled by such lever and including a controlling-switch actuated by the speed-controlled means independently of such lever, substantially as set forth.

23. The combination of an engine and an electric motor connected together so that each is adapted to actuate the other, the motor being provided with field-coils connected in multiple with the armature-coils and with additional field-coils connected in series with the armature-coils, electrical storage means connected thereto, and means for reversing the connections of the series field-coils to connect the motor as a dynamo with the storage means, substantially as set forth.

24. The combination of an engine and an electric motor connected together so that each is adapted to actuate the other, the motor being provided with field-coils connected in multiple with the armature-coils and with additional field-coils connected in series with the armature-coils, electrical storage means connected thereto, and means controlled by the speed of the motor for reversing the connections of the series field-coils to connect the motor as a dynamo with the storage means, substantially as set forth.

25. The combination of an engine, electric means for starting the engine by the application of power thereto and for utilizing the power of the engine when the engine is self-actuated to store energy, a lever for admitting and cutting off the supply of motive medium to the engine, such lever controlling the electric means for applying power to the engine, and means controlled by the speed of the engine and controlling the electric-power-storing means, substantially as set forth.

26. The combination of an engine, a power-storing device, and means for connecting the power-storing device with the engine to start the engine and for automatically connecting the engine with the power-storing device, under the control of the speed of the engine upon and not until the attainment of a speed of the engine sufficient for the power-storing operation.

Signed at New York, N. Y., this 8th day of February, 1901.

CLYDE J. COLEMAN.

Witnesses:
HENRY D. WILLIAMS,
HERBERT H. GIBBS.